United States Patent
Mitts

(10) Patent No.: US 6,318,940 B1
(45) Date of Patent: Nov. 20, 2001

(54) FASTENER FOR SELF-LOCKING SECUREMENT WITHIN A PANEL OPENING

(75) Inventor: Richard K. Mitts, Fullerton, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/598,142

(22) Filed: Jun. 21, 2000

(51) Int. Cl.$^7$ .......................... F16B 39/282; F16B 37/04
(52) U.S. Cl. .......................................... 411/188; 411/181
(58) Field of Search .................................. 411/161, 188, 411/187, 180, 181, 183

(56) References Cited

U.S. PATENT DOCUMENTS

| | | | |
|---|---|---|---|
| 1,759,339 | * | 5/1930 | Andren . |
| 2,096,041 | * | 10/1937 | Hosking . |
| 3,370,631 | * | 2/1968 | James . |
| 3,910,331 | * | 10/1975 | Randall . |
| 3,967,669 | | 7/1976 | Egner . |
| 4,294,300 | | 10/1981 | Bouwman . |
| 4,432,681 | * | 2/1984 | Capuano . |
| 4,637,766 | | 1/1987 | Milliser . |
| 4,657,459 | | 4/1987 | Landt . |
| 4,779,326 | * | 10/1988 | Ichikawa . |
| 4,893,976 | | 1/1990 | Milliser et al. . |
| 4,940,375 | | 7/1990 | Marvell et al. . |
| 4,985,978 | | 1/1991 | Milliser et al. . |
| 5,302,066 | | 4/1994 | Bieschke et al. . |
| 5,340,251 | * | 8/1994 | Takahashi . |
| 5,513,933 | | 5/1996 | Rom . |
| 5,528,812 | * | 6/1996 | Muller . |
| 5,743,691 | | 4/1998 | Donovan . |
| 5,797,175 | * | 8/1998 | Schneider . |

FOREIGN PATENT DOCUMENTS

2515283 * 4/1983 (FR) .

* cited by examiner

*Primary Examiner*—Flemming Saether
(74) *Attorney, Agent, or Firm*—Paul F. Donovan; Mark W. Croll; Donald J. Breh

(57) ABSTRACT

A fastener (10) for locking receipt in an opening (34) of panel (36) has an upper end portion (16), a flange (18), and a locking insert (24) for receipt in the opening (34) and forcibly distended to prevent removal of the fastener from the opening. A number of gripping means (22) formed in a surface of the flange (18) each include a knifelike edge (32) with a slot (33) at each side thereof. The gripping means bite into the panel providing purchase resisting rotation of the fastener relative to the panel.

6 Claims, 2 Drawing Sheets

FASTENER FOR SELF-LOCKING SECUREMENT WITHIN A PANEL OPENING

BACKGROUND

1. Background of the Invention

The present invention relates generally to a fastener such as a flange nut, for example, for locking securement within a panel opening. More particularly, the fastener of this invention achieves improved securement of the fastener within the panel opening against all forms of relative movement (e.g., axial, rotation, rocking).

2. Description of Related Art

Fasteners such as so-called clinch fasteners are known and generally include parts which, on being mounted to a panel opening, deform the panel to grip or clinch the fastener providing desired fixed securement of the fastener.

U.S. Pat. No. 3,967,669, CLINCH TYPE FASTENER, by Ronald J. Egner, includes a fastener with a nose portion of cross-section exceeding that of a metal plate opening to receive the fastener, and a locking groove that separates the nose portion from the fastener head. On installation, the nose portion cold works the opening to a larger size which forces plate metal into the locking groove to effect locking securement. Depending upon tolerances of the metal plate thickness and opening size, the amount of plate metal forced into the fastener groove can, at times, be too little to be effective for more than partial securement, and therefore results in load failure during use. On the other hand, excessive metal forced into the locking groove before the fastener head is also unsatisfactory and can result in failure by holding the head away from the plate surface.

Still further, where a fastener is of the threaded nut variety, locking integrity is desirably maintained against relative movement of the nut and plate generally parallel to the nut bore axis, rocking or wobbling about the axis and also preventing rotative movement about the bore axis when receiving a bolt or screw, for example.

SUMMARY OF THE INVENTION

In accordance with the practice of the present invention, there is provided a fastener of the threaded nut category for locking receipt within a metal panel opening of predetermined characteristics. The fastener includes a head portion adapted for receiving a wrench (e.g., to provide restraint during tapping or in emergency situations), a cylindrical flange of dimensions exceeding those of the panel opening, and a unitary deformable body extending away from the flange oppositely to that of the head portion. The deformable body has cross-sectional dimensions enabling sliding receipt within the panel opening. A central opening or bore extends through the head portion and deformable body and is provided with internal threads.

A plurality of panel gripping means are located on the flange surface, which in assembly face toward the panel and which are arranged in radially spaced apart relation about the deformable body. The gripping means each include a generally triangularly shaped tooth facing away from the flange.

On assembly, the deformable body of the fastener is inserted into the panel opening until the gripping means contact the panel surface adjacent to the opening, then a forming punch or tool is pressed against the outer end of the deformable body forming the body material into obstructing and locking contact with panel opening edges. Simultaneously, the gripping means bite into the panel thereby moving the panel material into the spaces between adjacent gripping means.

DESCRIPTION OF A PREFERRED EMBODIMENT

Figure 1:
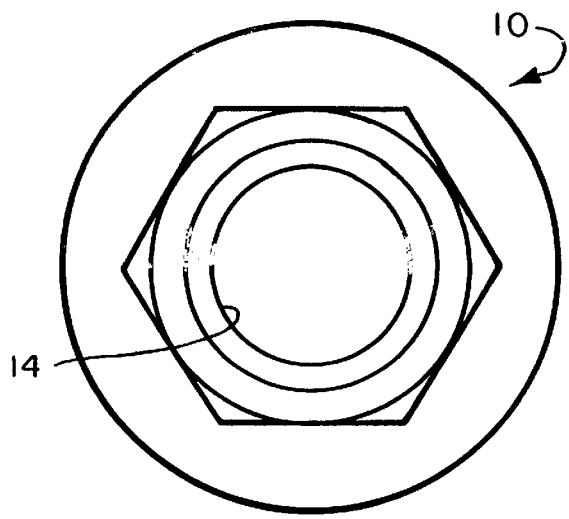
FIG. 1 is a top plan view of the fastener of this invention.
Figure 2:
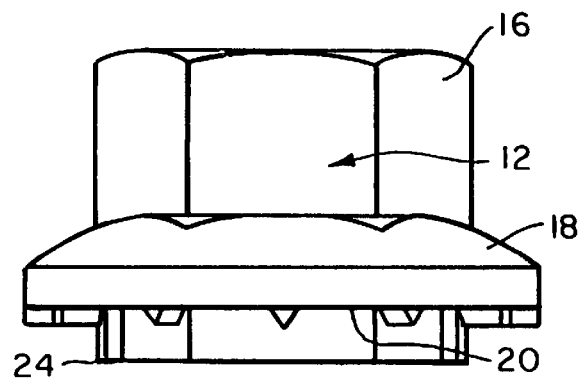
FIG. 2 is a side elevational view of the fastener of FIG. 1.
Figure 3:
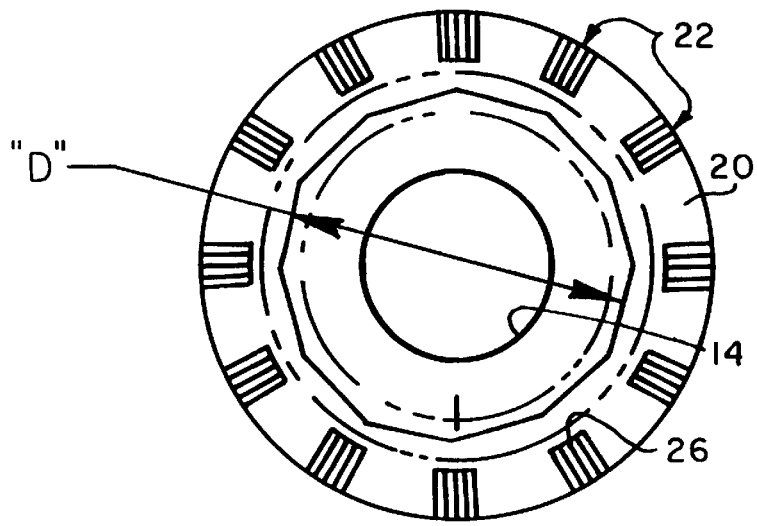
FIG. 3 is a bottom plan view of the fastener.

Turning now to the drawing, and particularly FIGS. 1–3, the fastener 10 of the invention is seen to include a one-piece generally cylindrical metal body 12 having a central bore 14 which is threaded where the fastener is contemplated to function as a nut. One end portion 16 is formed into a polygonal shape (e.g., hexagonal) enabling gripping securement by a wrench during tapping, for example. A continuous circular flange 18 extends about the fastener body defining a boundary limit for the end portion 16 and including a surface 20, which faces oppositely from the end portion 16. The surface 20 is formed into a plurality of gripping means 22 arranged at equal angle spacing about the fastener bore axis.

Figure 4:
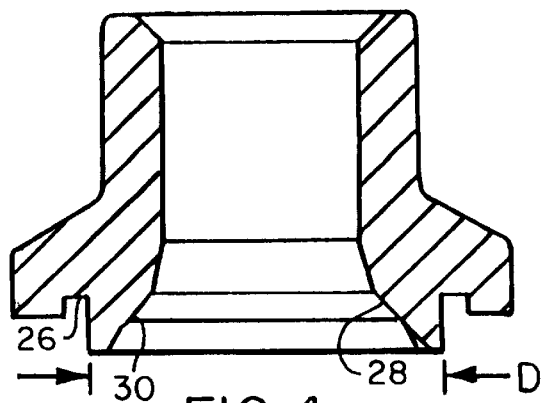
FIG. 4 is a side elevational, sectional view of the fastener.

A locking insert 24 with its outer lateral surface formed into a polygon cross-section with a plurality of flats 25 (e.g., 12) extends axially away from the flange and has an external maximum dimension D. A continuous groove 26 in the fastener body 12 separates the outer wall of insert 24 from the gripping means 22. The fastener body bore 14 is widened to a first extent 28 directly opposite the flange and to a second greater extent 30 adjacent the outer end of the locking insert 24 (FIG. 4). More particularly, the undercuts 28 and 30 preferably measure 15 degrees and 30 degrees from the bore axis.

Figure 6:
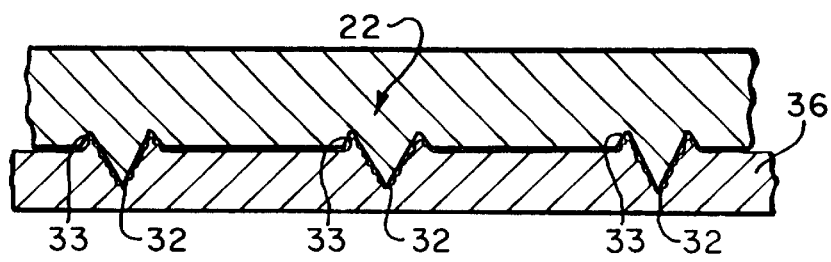
FIG. 6 is an enlarged elevational view of fastener gripping means shown in engagement with panel material.

For the ensuing detailed description of the gripping means 22, reference is now made simultaneously to FIGS. 2, 3, and 6. Each such means 22 is an elongated member of a triangular cross-section formed to have a single knife-like edge 32 that extends generally along a cross-section radius of the fastener body. The gripping means member extends from the flange outer edge to a point immediately adjacent the groove 26 (FIG. 3). As can be seen best in FIG. 6, a slot 33 is formed in the flange surface 20 immediately adjacent each gripping means.

Figure 5:
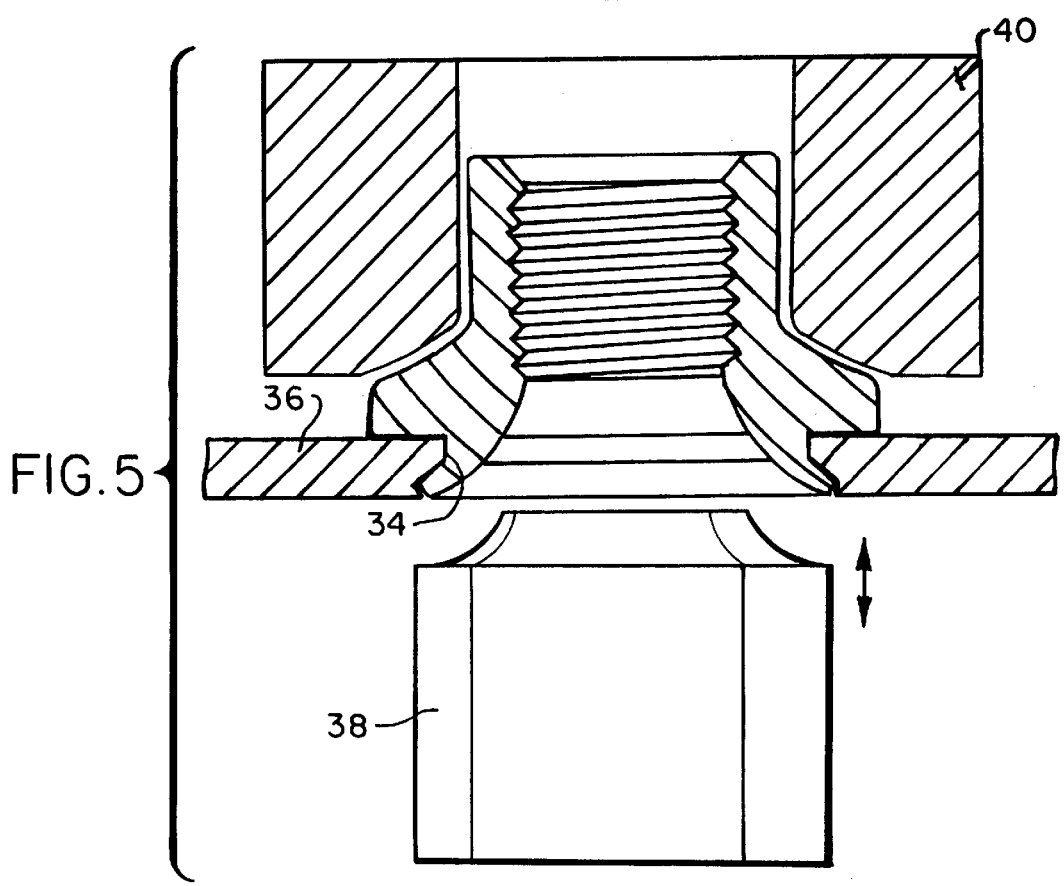
FIG. 5 is a side elevational view of the fastener shown mounted to a panel opening.

As already alluded to, in use the fastener is mounted within an opening 34 in a panel 36. Specifically, the opening 34 has a diameter equal to (or slightly greater than) the diameter D of the locking insert 24, enabling full receipt of the insert therewithin such that the flange and gripping means abut against the panel adjacent the opening 34. With the fastener firmly maintained in this relation to the panel, a forming tool 38 is forced against the lower outer end of the locking insert transversely deforming the insert to lock about panel opening edges (FIG. 5). On deforming the insert 24 in this way, each of gripping means edges 32 bites into the panel material which forces the material into the slots 33 adjacent the gripping means 22 (FIG. 6). This action serves to prevent relative rotation between the fastener and panel once they are assembled as described. Also, since the panel material "overflow" is received within the slots 33 (i.e., below surface 20) this avoids the undesirable result of the flange being held spaced from the panel by the overflow which would be detrimental to fastener mounting strength characteristics.

A practical construction of the fastener of this invention from SAE 1045 steel wire which enables the nut to be heat treated during an austempering process which provides necessary hardness to cause the softer panel to conform to the nut gripping means as well as provide ductility for forming.

Although the invention has been described in connection with a preferred embodiment, it is to be understood that those skilled in the appertaining arts may contemplate modifications that come within the spirit of the invention as described and claimed.

What is claimed is:

1. A fastener for immovable securement within a panel opening, comprising:
   a body having a first end portion, a second end portion transversely distensible to form locking means, and an outwardly extending circular band flange separating the first and second end portions; and
   a plurality of gripping means formed in surface of the flange facing generally along the body second portion and angularly spaced apart about said body second portion, each corner edge including a corner edge projecting outwardly away from said surface along a radius line of the circular band flange and a slot being formed at each side of each gripping means in the flange surface and extending below the flange outer surface.

2. A fastener as in claim 1, in which on assembly of the fastener to the panel each gripping means raised edge bites into the panel forcing overflow panel material into the adjacent slots.

3. A fastener as in claim 1, in which the body first end portion includes a plurality of flat side surfaces enabling gripping by a tool.

4. A fastener as in claim 1, in which the body second end portion includes an outer peripheral surface with a plurality of flats formed therein.

5. A fastener as in claim 1, in which the fastener is made from steel which is heat treated.

6. A fastener as in claim 5, in which the fastener is made of SAE 1045 steel.

\* \* \* \* \*